UNITED STATES PATENT OFFICE.

FRANZ SCHOLL, OF HÖCHST-ON-THE-MAIN, GERMANY, ASSIGNOR TO FARBWERKE VORM.
MEISTER LUCIUS & BRÜNING, OF HÖCHST-ON-THE-MAIN, GERMANY, A CORPORATION OF GERMANY.

BLACK MONOAZO DYESTUFFS AND PROCESS OF MAKING SAME.

1,032,433.  Specification of Letters Patent.  Patented July 16, 1912.

No Drawing.   Application filed November 9, 1911.   Serial No. 659,400.

*To all whom it may concern:*

Be it known that I, FRANZ SCHOLL, Ph. D., chemist, a citizen of the Empire of Germany, residing at Höchst-on-the-Main, Germany, have invented certain new and useful Improvements in Black Monoazo Dyestuffs and Processes of Making Same, of which the following is a specification.

I have found that black basic dyestuffs are obtained by combining the diazo compounds of asymmetrical dialkylsafranins with 1-aryl-3-methyl-5-pyrazolone. The dyestuffs thus produced correspond to the formula:

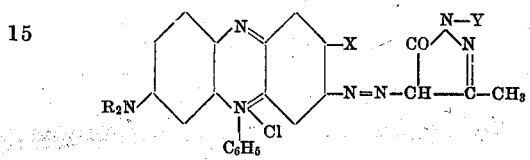

wherein "R" stands for an alkyl group, "X" for a hydrogen atom capable of being replaced by a methyl group, and "Y" for an aryl residue.

Example: 35 kilos of dimethylphenosafranin are dissolved in about 1500 liters of water; to this solution are added 30 kilos of hydrochloric acid of 19° Bé. and, after cooling the whole is diazotized by means of 6.9 kilos of sodium nitrite. To this diazo solution which is of a pure blue color, is added a solution of 18 kilos of pyrazolone in about 100 liters of water and 20 kilos of hydrochloric acid of 19° Bé. The excess of this acid is removed by adding some sodium acetate. After some hours, the mass is heated to 40–50° C. and salted out with a small quantity of common salt. The dyestuff thus obtained has the formula:

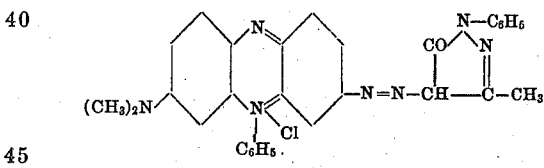

It is a black powder, soluble in water with a greenish-blue color, separating on addition of ammonia a blue precipitate, soluble in alcohol with a violet color, insoluble in ether, benzene and ligroin. It dyes in a neutral bath unmordanted and tanned cotton and also artificial silk black tints. The same result may be obtained by replacing the dimethylphenosafranin by equivalent quantities of diethylpheno- or dimethyl- or diethyltolu-safranin, or by using other pyrazolones.

Having now particularly described my invention, what I claim is:

1. As new products, the herein described dyestuffs of the formula:

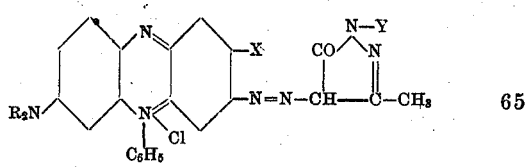

wherein "R" stands for an alkyl group, "X" for a hydrogen atom capable of being replaced by a methyl group, and "Y" for an aryl residue; being black powders, soluble in water and alcohol, insoluble in ether, benzene and ligroin, dyeing in a neutral bath unmordanted and tanned cotton and also artificial silk black tints.

2. As a new product, the dyestuff of the formula:

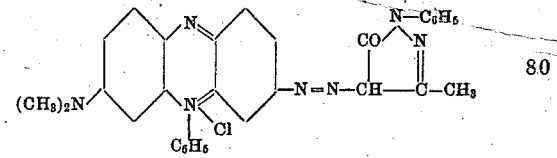

being a black powder, soluble in water with a greenish-blue color, separating on addition of ammonia a blue precipitate, soluble in alcohol with a violet color, insoluble in ether, benzene and ligroin, dyeing in a neutral bath unmordanted and tanned cotton and artificial silk black tints.

3. The process of making black basic monoazo dyestuffs, which consists in combining the diazo compounds of asymmetrical dialkylsafranins with 1-aryl-3-methyl-5-pyrazolone.

In testimony whereof, I affix my signature in presence of two witnesses.

FRANZ SCHOLL.

Witnesses:
 JEAN GRUND,
 CARL GRUND.